United States Patent [19]
Neri et al.

[11] Patent Number: 5,297,924
[45] Date of Patent: Mar. 29, 1994

[54] APPARATUS FOR THE SELECTIVE PALLETIZATION OF ARTICLES HAVING DIFFERENT CHARACTERISTICS

[75] Inventors: Armando Neri, Bologna; Verter Cesari, Granarolo Emilia, both of Italy

[73] Assignee: G.D. S.p.A., Bologna, Italy

[21] Appl. No.: 883,442

[22] Filed: May 15, 1992

[30] Foreign Application Priority Data

May 22, 1991 [IT] Italy ............................ 000169 A/91

[51] Int. Cl.$^5$ .............................................. B65G 1/18
[52] U.S. Cl. .................................. 414/799; 209/583
[58] Field of Search .................. 414/799, 790.7, 792.7, 414/799; 221/277, 271; 195/575, 572; 901/7; 209/583, 569, 3.3

[56] References Cited

U.S. PATENT DOCUMENTS

| | | | |
|---|---|---|---|
| 3,263,827 | 8/1966 | Verrinder | 414/790.7 |
| 4,986,726 | 1/1991 | Benuzzi et al. | 414/799 |
| 5,024,570 | 6/1991 | Kiriseko et al. | 901/7 |
| 5,180,277 | 1/1993 | Pearce et al. | 414/792.7 |

FOREIGN PATENT DOCUMENTS

| | | | |
|---|---|---|---|
| 0238616 | 10/1986 | Japan | 414/927 |
| 0162631 | 6/1989 | Japan | 414/799 |
| 0276725 | 11/1990 | Japan | 414/799 |
| 0098916 | 4/1991 | Japan | 414/799 |

*Primary Examiner*—David H. Bollinger
*Assistant Examiner*—Carol Wallace
*Attorney, Agent, or Firm*—Guido Modiano; Albert Josif; Daniel O'Byrne

[57] ABSTRACT

Apparatus for the selective palletization of articles, particularly boxes, having different characteristics, including an article bar code reader which controls an automatic transfer device for the selective transfer of the articles from a feeder conveyor to respective pallets arranged in respective processing stations for loading the pallets with articles and for removing the loaded pallets, in which the processing stations are aligned above respective segments of a conveyor for transferring empty pallets from an accumulation unit for a stack of unloaded pallets, and an elevator device for the unloaded pallets which is interposed between the exit conveyor and each processing station, which defines, together with the related segment of the conveyor and with the related elevator device, a processing module which is actuated in a substantially independent manner.

21 Claims, 4 Drawing Sheets

5,297,924

APPARATUS FOR THE SELECTIVE PALLETIZATION OF ARTICLES HAVING DIFFERENT CHARACTERISTICS

BACKGROUND OF THE INVENTION

The present invention relates to an apparatus for the selective palletization of articles having different characteristics.

The present invention solves, in a simple and fully automatic manner, a problem which is common to many manufacturing industries and relates to the provision of a palletization apparatus which is able to remove articles having different characteristics, for example boxes, from a common feeder, of selecting said articles according to their characteristics, and of grouping together the articles which have common characteristics, i.e. that belong to a same type or "family", on pallets whose feeding to respective loading stations is performed s as to entail no substantial interruption of the production cycle.

SUMMARY OF THE INVENTION

According to the present invention, an apparatus is provided for the selective palletization of articles which have different characteristics, and which are identified by respective codes which define a set number of families of articles, the apparatus comprising a common feeder conveyor for the articles, a reader for the related codes, and a palletization unit for the articles, characterized in that the palletization unit comprises: a plurality of processing stations, whose number is at least equal to the number of said families, for loading respective pallets and for removing the loaded pallets; a unit for accumulating unloaded pallets; exit conveyor means for transferring the unloaded pallets from the accumulation unit to said processing stations which are distributed along and above said exit conveyor means; and elevator means for the unloaded pallets which are interposed between the exit conveyor means and each processing station, the apparatus further comprising automatic transfer means, controlled by said reader, for selectively transferring the articles from the common feeder conveyor to respective said processing stations.

According to a preferred embodiment of the above described apparatus, the exit conveyor means are divided into segments, each of which is connected to each adjacent segment and comprises a final portion arranged below a respective said processing station; each one of said segments defining, together with the related processing station and with the related said elevator means, an independently actuated processing module.

The above defined preferred embodiment solves, in an original manner, the problem of providing a palletization apparatus which is extremely flexible and can be rapidly adapted to any number of "families" of articles present to be selected by bypassing part of the processing module which are present or by adding further processing modules at any time.

BRIEF DESCRIPTION OF THE DRAWINGS

The invention is now described with reference to the accompanying drawings, which show a non-limitative example of an embodiment thereof, wherein.

DESCRIPTION OF THE PREFERRED EMBODIMENTS

Figure 1:
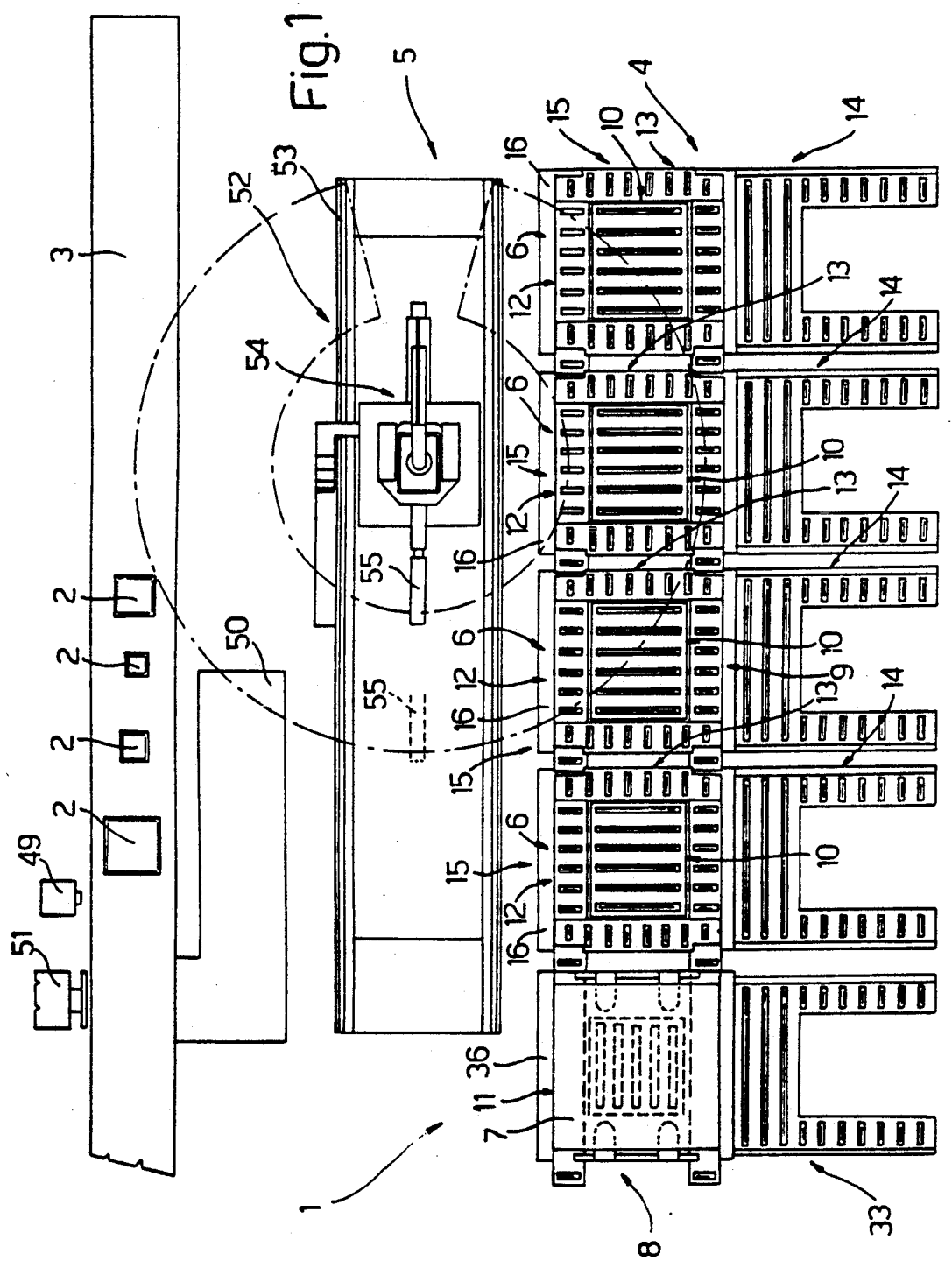
FIG. 1 is a schematic plan view of a preferred embodiment of the palletization apparatus according to the present invention.

With reference to FIG. 1, the reference numeral 1 generally designates a modular apparatus for the automatic selective palletization of articles, in the particular case boxes 2, which have different characteristics related both to their different shapes and/or dimensions and to their different content. According to the particular illustrated example, the apparatus 1 is suitable for selectively palletizing boxes 2, which can be divided, according to their characteristics, into four distinct families. As will become apparent hereinafter, the apparatus 1 has a modular structure which allows to expand said apparatus 1 so as to adapt it to any number of distinct families.

The apparatus 1 comprises a common conveyor 3 for feeding the boxes 2, each of which has a code (not illustrated), normally a bar code. The apparatus 1 furthermore comprises a unit 4 for the selective palletization of the boxes 2 and a unit 5 for transferring the boxes 2 from the conveyor 3 to the palletization unit 4.

The palletization unit 4 comprises a plurality of processing stations 6 (four in the illustrated example), whose number is at least equal to the number of said families, for loading respective unloaded pallets 7 and for removing the loaded pallets 7, a unit 8 for accumulating unloaded pallets 7, and a conveyor 9 for transporting the unloaded pallets 7 from the accumulation unit 8. The processing stations 6 are distributed along the conveyor 9 so as to receive the unloaded pallets 7 from the accumulation unit 8 and are arranged at a higher level than the conveyor 9; each processing station is coupled to said conveyor 9 by means of an elevator device 10 which is suitable for lifting, in succession, the unloaded pallets 7 from the conveyor 9 to the level of said processing stations 6.

The conveyor 9 comprises a segment 11 (FIG. 4) which extends though the accumulation unit 8, and further adjacent and mutually independent aligned segments 12 whose number is equal to the number of stations 6; each segment 12 has an output end which is arranged below the related station 6 and an input end which is adjacent and connected to an output end of an adjacent segment 12 or of the segment 11.

Each station 6 comprises an unloading conveyor 13 for supporting a pallet 7 while it is being filled, and a roller platform 14 which is aligned with, and adjacent to, an output end of the related unloading conveyor 13 in order to receive in succession from said unloading conveyor 13 the pallets 7 once they have been filled.

Each station 6 constitutes, together with the related elevator device 10 and with the related segment 12 of the conveyor 9, an independent processing module 15 (FIG. 2) which is arranged in series with respect to the other processing modules 15 along the conveyor 9 starting from the accumulation unit 8.

Figure 2:
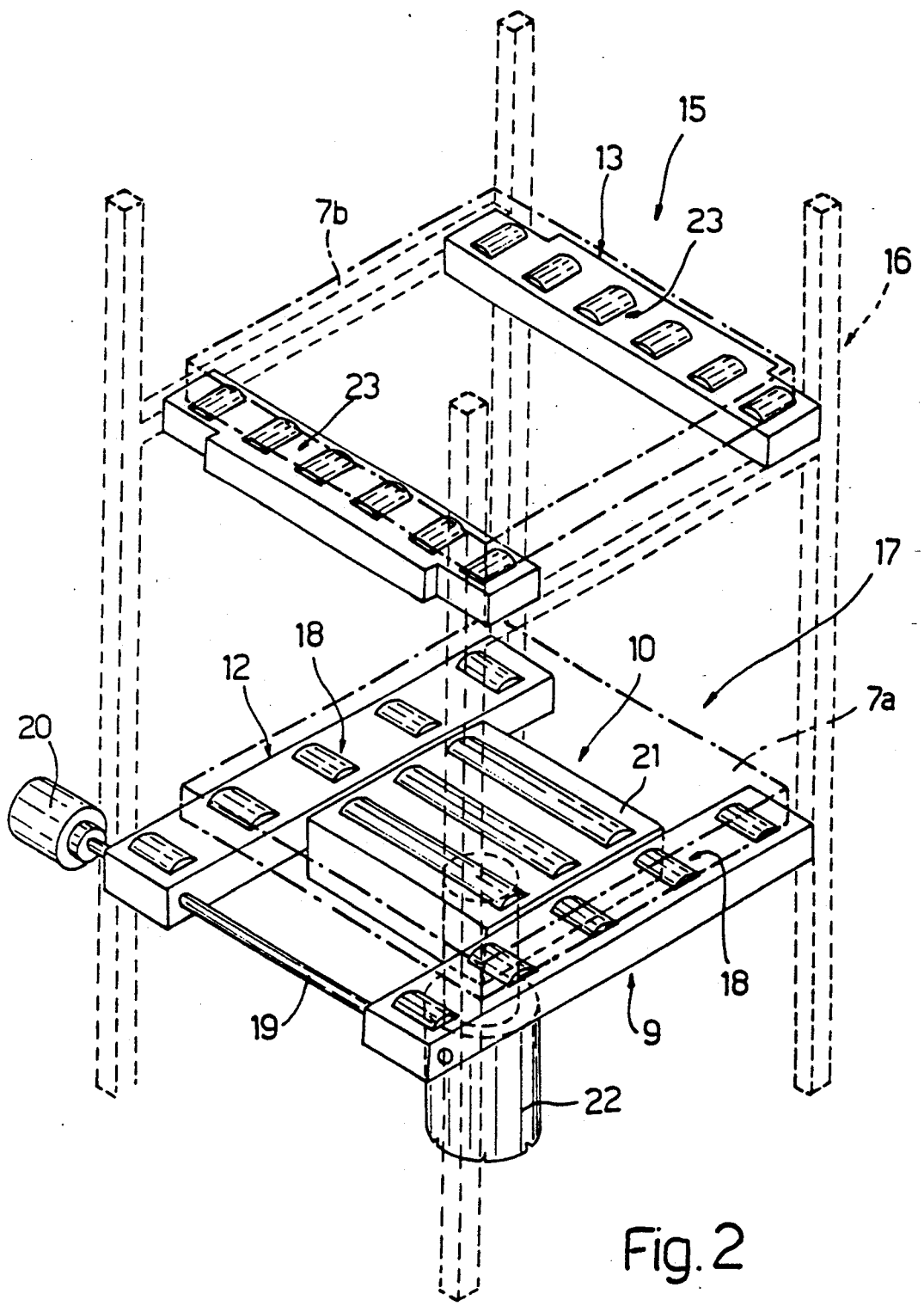
FIG. 2 is a schematic enlarged-scale perspective view, with parts removed for the sake of clarity, of a first detail of FIG. 1.

According to what is shown in FIG. 2, each processing module 15 comprises a frame 16 which is rigidly connected to the frames 16 of the adjacent modules 15 and which defines two superimposed Working surfaces; the related segment 12 of the conveyor 9 is mounted at the first one of said surfaces, which is arranged below, and the unloading conveyor 13 is mounted at the second surface and is superimposed on a final or output portion of the related segment 12 and defines, together with said segment 12, a channel 17 for the selective feeding of the unloaded pallets 7 toward the processing stations 6.

The segment 12 of each processing module 15 is defined by two known roller conveyors 18 which are horizontal, mutually parallel, co-planar, supported by the frame 16, and provided with a common actuation shaft 19 which is connected to the output of a respective motor 20 which can be actuated independently of the motors 20 of the segments 12 of the other processing modules 15. The two conveyors 18 are arranged at such a distance from one another that they engage and support opposite lateral portions of a pallet 7 which, by virtue of the actuation of the motor 20, is transferred toward said output portion of said conveyors 18, and into a position for removal, by means of the elevator device 10.

The elevator device 10 comprises a platform 21 and a linear actuator 22 which supports said platform 21 and which is suitable for moving said platform 21 between a lowered inactive position, wherein the platform 21 is arranged at a level which is at the most equal to the level of the conveyors 18 and between said output portions of said conveyors 18, and an active raised position, wherein the platform 21 is arranged above the level of the unloading conveyor 13.

Figure 3:
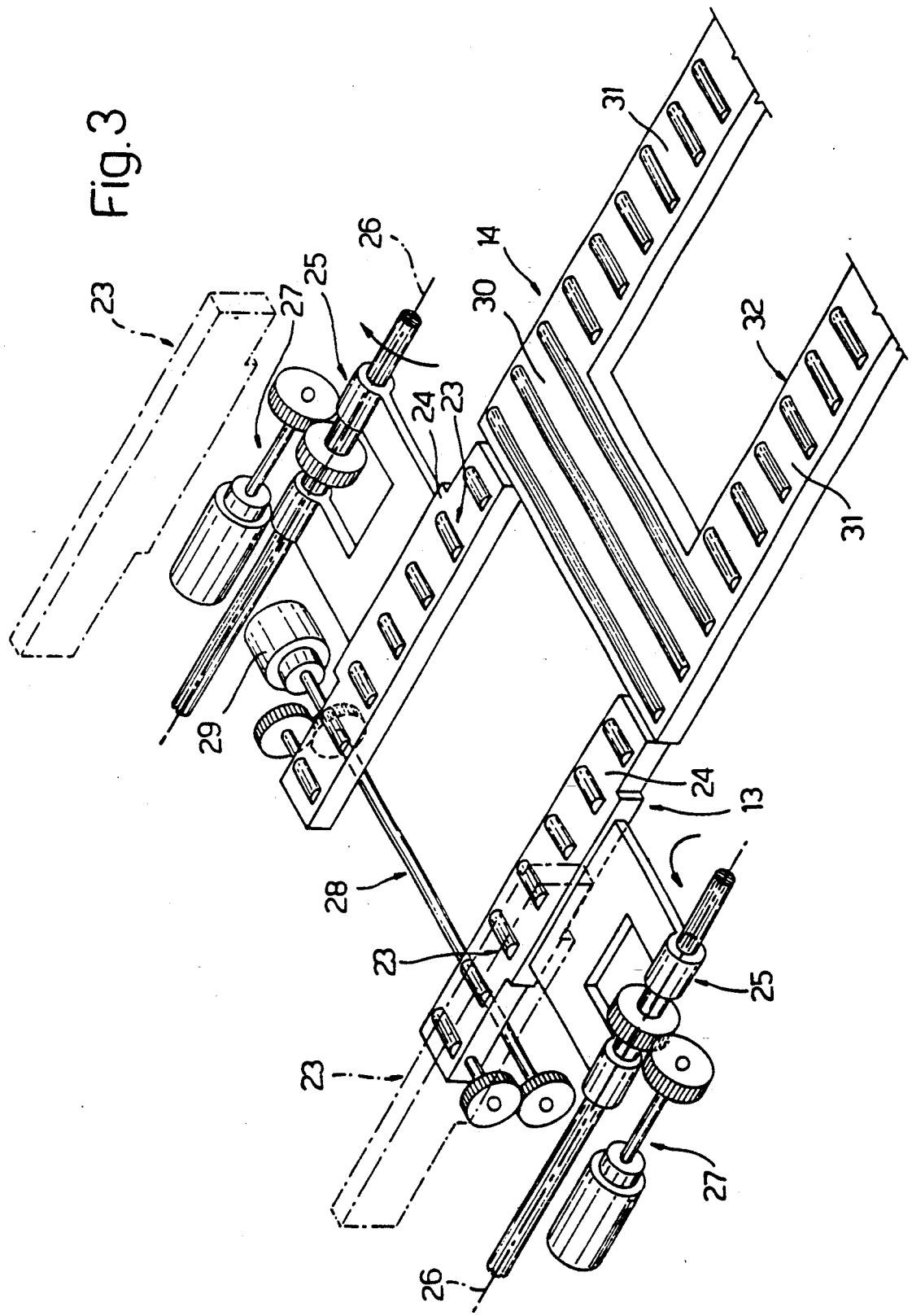
FIG. 3 is a schematic enlarged-scale perspective view, with parts removed for the sake of clarity, of a second detail of FIG. 1.

According to what is illustrated in FIG. 3, the unloading conveyor 13 also comprises two known roller conveyors 23 which are horizontal, mutually parallel, co-planar, and substantially identical, in terms of width and relative position, to the two conveyors 18 but which extend transversely to the conveyor 9. The conveyors 23 have respective frames 24, and an outer longitudinal edge of each of said frames 24 is connected to the frame 16 by means of a hinge 25 whose axis 26 is horizontal and transverse to the conveyor 9. The hinges 25 are suitable for allowing the frames 24 to rotate upward in opposite directions about the related axes 26, under the thrust of respective actuation devices 27, from said normal lowered horizontal and mutually co-planar positions (shown in solid lines in FIG. 3), wherein the conveyors 23 are coupled to a single actuation motor 29 by means of a common transmission 28 and wherein a passage is defined between the lowered conveyors 23 which is at least as wide as the platform 21, to a raised position (shown in dot-and-dash lines in FIG. 3), wherein the conveyors 23 have substantially vertical arrangements and wherein a passage is defined between the raised conveyors 23 which is at least as wide as a pallet 7.

The roller platform 14 comprises a platform 30 with rollers which is co-planar with respect to the unloading conveyor 13 and which is adjacent to an output end of said conveyor 13. The platform 30 is substantially U-shaped in plan view and is provided, at its end which is opposite to the one which faces the conveyor 13, with two arms 31 which are arranged so as to be aligned with respect to the conveyors 23 and which define, between them, a seat 32 for the docking of a truck (not shown) for removing a loaded pallet 7 fed by the conveyors 23 onto the roller platform 14.

Figure 4:
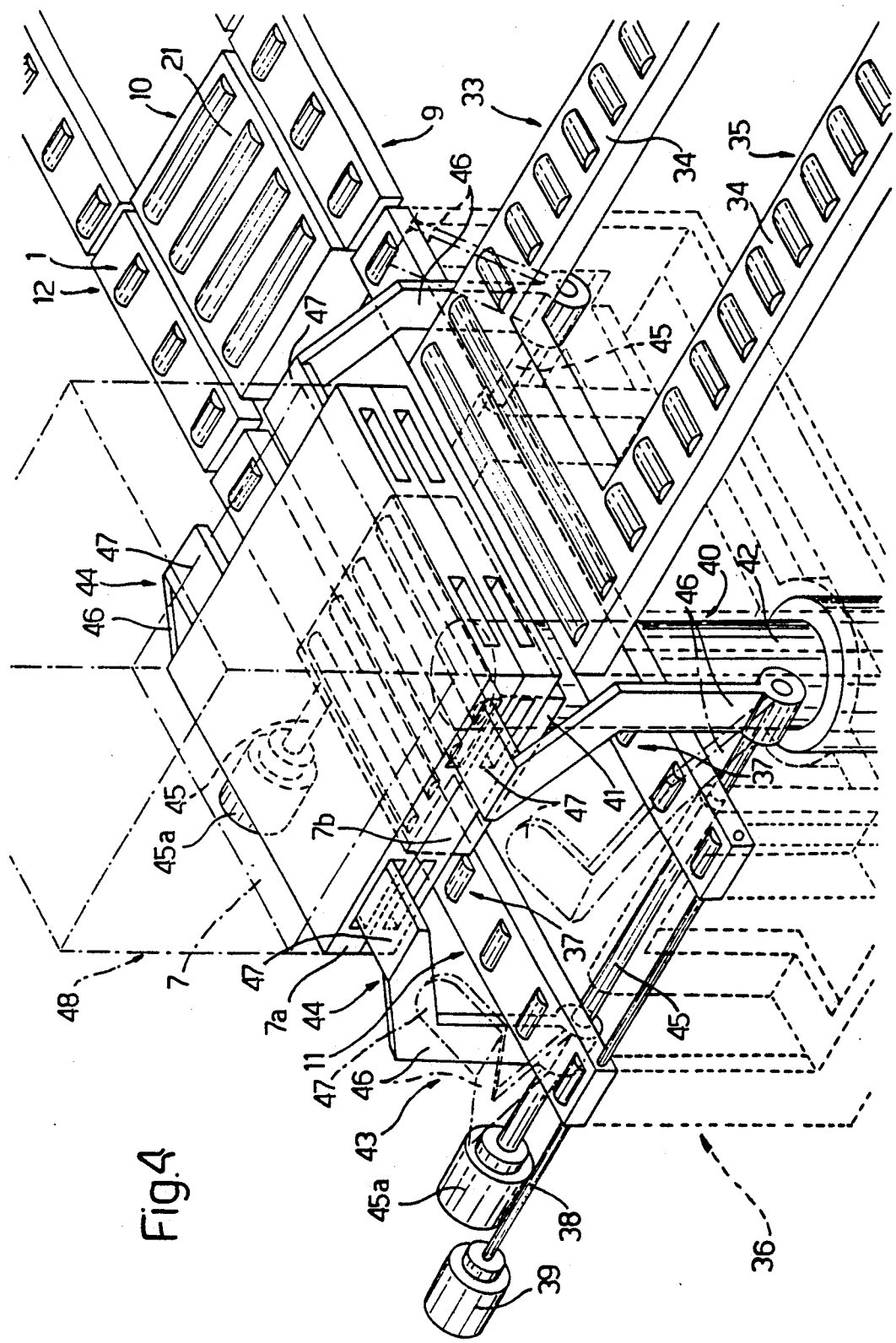
FIG. 4 is a schematic enlarged-scale perspective view, with parts removed for the sake of clarity, of a detail of FIG. 3.

According to what is shown in FIG. 4, the accumulation unit 8 comprises an input roller conveyor 33 which is arranged transversely to the segment 11 of the conveyor 9 and at a level which is raised with respect to said conveyor 9 by a distance which is at least equal to the thickness of a pallet 7. The conveyor 33 is substantially U-shaped in plan view and is provided, at one input end which is opposite to an output end which faces the segment 11 of the conveyor 9, with two arms 34 which define, between them, a seat 35 for the docking of a truck (not illustrated) which is suitable for feeding onto said conveyor 33 a stack (not shown) of unloaded pallets 7.

The accumulation unit 8 comprises a frame 36 (FIGS. 1 and 4) which supports said segment 11 which, similarly to each segment 12, is defined by two known horizontal roller conveyors 37 which are mutually parallel and co-planar, which are aligned with, and co-planar to, respective adjacent conveyors 18, and which are coupled to a common actuation shaft 38 which is connected to the output of a motor 39 which can be actuated independently of the motors 20 of the processing modules 15.

Preferably, the motor 39 is a reversible motor which is suitable for allowing the segment 11 to operate selectively in one direction or the other. The reversibility of the motor 39 allows the arrangement of all the processing modules 15 on the same side of the accumulation unit 8, as in the illustrated example, or, according to a variation on both sides of the accumulation unit 8.

The space comprised between the two conveyors 37 is occupied by an elevator device 40 which comprises a platform 41 which is supported by a linear actuator 42 which is suitable for moving said platform 41 among a lowered position wherein an upper surface of the platform 41 is arranged so as to be co-planar with respect to the conveyor 9, an intermediate position wherein said upper surface of the platform 41 is arranged above the plane of the conveyor 9 so as to be co-planar with respect to the input conveyor 33, and a raised position wherein said upper surface of the platform 41 is arranged above the input conveyor 33 by a distance which is equal to the thickness of a pallet 7.

Finally, the accumulation unit 8 comprises a movable supporting device 43 which in turn comprises two engagement forks 44 which are supported, in a manner which is not illustrated, by the frame 36 on the outside of the conveyors 37 and which are arranged on opposite sides of the elevator device 40. Each fork 44 comprises a bar 45, which is transverse to the conveyor 9 and is mounted on the frame 36 so as to be rotatable about its own axis under the thrust of a motor 45a, and two substantially L-shaped brackets 46 which define between them, in any one of their working positions, a passage whose transverse dimensions are similar to those of the channel 17 which is such as to always allow the passage of a pallet 7 between the brackets 46 of each fork 44. The brackets 46 of each fork 44 are rigidly associated with the related bar 45 and can rotate together with said bar 45 between an inactive disengagement position (shown in dot-and-dash lines in FIG. 4) and an active engagement position (shown in solid lines in FIG. 4), wherein each bracket 46 engages and supports in position, with one of its right-angled terminal arms 47, a pallet 7a of a stack 48 of pallets 7 which are supported by the platform 41 in its raised position. In the stack 48, the pallet 7a occupies the second position from the bottom and is arranged directly above a pallet 7b which is arranged in direct contact with the platform 41 and, as previously mentioned, above the plane of the conveyor 9 and in a position which is co-planar with respect to the upper surface of the input conveyor 33.

According to what is shown in FIG. 1, the unit 5 for transferring the boxes 2 from the conveyor 3 to the palletization unit 4 comprises a reader 49 for said codes (not shown) of the boxes 2, and an accumulation conveyor 50 which extends transversely from the conveyor 3 and which is coupled thereto preferably by means of a pusher element 51 which is suitable for transferring in succession the boxes 2, under the control of the reader 49, from the conveyor 3 to said conveyor 50.

The transfer unit 5 furthermore comprises a transfer device 52, which is interposed between the conveyor 50 and the palletization unit 4 and which comprises a guide or rail 53 which extends along the conveyor 9, and a known self-propelled robot 54 which comprises an extendable engagement arm 55 and which can move along the rail 53, under the control of the reader 49, between a position for engaging a box 2 arranged on the conveyor 50 and a position for releasing said box 2 onto any available portion of a related pallet 7 which is arranged on the unloading conveyor 13 of the related station 6.

During use, when the apparatus 1 is empty, a stack 48 of unloaded pallets 7 is fed, by means of a truck which has been mentioned earlier and is not illustrated, to the input conveyor 33 of the accumulation unit 8, wherein the elevator device 40 is arranged in its intermediate position which is co-planar with respect to said conveyor 33. The conveyor 33 carries said stack 48 of pallets 7 above the platform 41, and the motors 45a of the movable supporting device 43 are actuated so as to move the arms 47 of the forks 44 into engagement with the pallet 7a of the stack 48 and support said stack 48, with the exception of its lower pallet 7b, in this raised position.

The subsequent return of the platform 41 to its lowered position causes the lowering of the pallet 7b alone and its deposition above the conveyors 37; the actuation of the motor 39 of said conveyors 37 entails the feeding of the pallet 7b above the conveyors 18 of the processing module 15 which is directly adjacent to the accumulation unit 8.

The pallet 7b is then moved forward along the conveyor 9, by means of the successive activation of the motors 20, until it stops above the exit portion of the conveyors 18 of the processing module 15 which defines a terminal portion of the conveyor 9. The subsequent actuation of the actuator 22 of the elevator device 10 of this last processing module 15, and the simultaneous actuation of the related actuation devices 27, entail the movement of the related platform 21 to its active raised position and the upward rotation of the frames 24 of the conveyors 23 in order to allow the passage of the pallet 7b, carried by the platform 21, between said conveyors 23. Once the pallet 7b has passed, the conveyors 23 are returned to their horizontal position by the actuation devices 27, so as to support the pallet 7b in a standby position at the related processing station 6. The pallet 7b is then released onto the conveyors 23 as a consequence of the return of the platform 21 to its inactive lowered position.

While the terminal processing module 15 performs the above described operations, the platform 41 of the elevator device 40 of the accumulation unit 8 is moved into its raised position in contact with the lower surface of the pallet 7a. Subsequently, the forks 44 are disengaged from the pallet 7a, so as to allow the platform 41 to return to its intermediate position, and said forks are thus returned into engagement with the pallet 7 which is arranged directly above the pallet 7a. The pallet 7a is then lowered by the platform 41 onto the conveyors 37 and is fed, by means of the subsequent actuation of the motor 39 and of the motors 20, along the channel 17 until it is arranged in standby position on said output portion of the conveyors 18 of said terminal processing module 15 directly below the pallet 7b.

The above described operations are repeated until two pallets 7 are present in said two upper and lower standby positions on each of the processing modules 15. Naturally, the stack 48, once depleted, is replaced with a new stack 48 which is fed onto the conveyor 33 in the previously described manner.

At this point the feeder conveyor 3, which can be constituted by a carousel, is activated; said conveyor feeds in succession, by means of the pusher element 51, the boxes 2 onto the accumulation conveyor 50, from which said boxes 2, once they have been classified by the reader 49, are removed by the robot 54 in order to be transferred, according to a set control logic which normally takes into account the previous movements of said robot 54, onto available spaces of respective pallets 7 which are arranged in standby on the conveyors 23 of the related stations 6.

As they are progressively filled, said pallets 7 are removed by means of the actuation of the respective conveyors 13 and of the respective roller platforms 14, and each one is replaced with the pallet 7 which is arranged in the related lower standby position. This last position, which has remained empty, is occupied by actuating the motors 20 only of the processing modules 15 arranged between the affected module 15 and the accumulation unit 8, so as to advance by one step the pallets 7 arranged inside the channel 17 upstream of said empty position in the advancement direction of the conveyor 9 and so as to create, inside said channel 17 and on the processing module 15 which is arranged directly adjacent to the accumulation unit 8, an empty position which is immediately occupied by a further pallet 7 which is fed by said accumulation unit 8.

We claim:

1. Apparatus for the selective palletization of articles which have different characteristics and which are identified by respective codes defining a set number of families of articles, the apparatus comprising a common feed conveyor for said articles a reader for the related codes, and a palletization unit for the articles, wherein the palletization unit comprises: a plurality of processing stations, whose number is at least equal to the number of said families, for loading respective pallets and for removing the loaded pallets; and accumulation unit for accumulating unloaded pallets; exit conveyor means for transferring the unloaded pallets from said accumulation unit to said processing stations which are distributed along and above said exit conveyor means; elevator means for the unloaded pallets which are interposed between said exit conveyor means and each processing station; the apparatus further comprising automatic transfer means, controlled by said reader, for selectively transferring the articles from said common feed conveyor to respective ones of said processing stations; and said exit conveyor means being divided into segments, each of which is connected to each adjacent segment and each of which comprises a final portion which is arranged below a respective said processing station, each one of said segments being provided with independent actuation means, and each one of said segments comprising two first mutually adjacent and motorized conveyors which are adapted for engaging opposite lateral portions of said pallets, said elevator means being related to each of said processing stations comprising a platform which is movable between said first conveyors toward and away from an inactive position being substantially coplanar with respect to said two first conveyors.

2. Apparatus according to claim 1, wherein said processing stations define, above said exit conveyor means, a channel for the selective feeding of the unloaded pallets from said accumulation unit to each one of said processing stations.

3. Apparatus according to claim 1, wherein said exit conveyor means being divided into segments, each of which is connected to each adjacent segment and each of which comprises a final portion which is arranged below a respective said processing station, each one of said segments defining, together with a related said processing station and with a related said elevator means, a processing module with independent actuation.

4. Apparatus according to claim 1, wherein each one of said processing stations comprises a supporting and unloading conveyor for supporting related ones of said pallets during filling thereof by said transfer means and for unloading the pallets once they are loaded, said supporting and unloading conveyors extending transversely with respect to said exit conveyor means.

5. Apparatus according to claim 4, wherein each one of said supporting and unloading conveyors comprises two second mutually adjacent motorized conveyors which are suitable for engaging opposite lateral portions of said pallets, said platform of the elevator means related to each one of said processing stations being movable between the related said two second conveyors between said inactive position and an active raised position, wherein said platform is arranged at a higher level than the related said processing station.

6. Apparatus according to claim 5, wherein said two second conveyors of a same processing station are movable with respect to one another between a first normal position in which said two second conveyors define, between them, a passage whose width is at least equal to the width of the platform of the related elevator means, and a second position in which said second conveyors define, between them, a passage whose width is at least equal to the width of one of said pallets, actuation means being provided for moving said second conveyors between said first and second positions.

7. Apparatus for the selective palletization of articles which have different characteristics and which are identified by respective codes defining a set number of families of articles, the apparatus comprising a common feed conveyor for said articles, a reader for the related codes, and a palletization unit for the articles, wherein the palletization unit comprises: a plurality of processing stations, whose number is at least equal to the number of said families, for loading respective pallets and for removing the loaded pallets; an accumulation unit for accumulating unloaded pallets; exit conveyor means for transferring the unloaded pallets from said accumulation unit to said processing stations which are distributed along and above said exit conveyor means; elevator means for the unloaded pallets which are interposed between said exit conveyor means and each processing station; the apparatus further comprising automatic transfer means, controlled by said reader, for selectively transferring the articles from said common feeder conveyor to respective ones of said processing stations; and said exit conveyor means being divided into segments, each of which is connected to each adjacent segment and each of which comprises a final portion which is arranged below a respective said processing station, each one of said segments being provided with independent actuation means, said exit conveyor means comprising a further segment which extends through said accumulation unit, and independent actuation means for said further segment.

8. Apparatus according to claim 7, wherein the actuation means of said further segment are reversible actuation means.

9. Apparatus according to claim 7, wherein said processing stations define, above said exit conveyor means, a channel for the selective feeding of the unloaded pallets from said accumulation unit to each one of said processing stations.

10. Apparatus according to claim 7, wherein said exit conveyor means being divided into segments, each of which is connected to each adjacent segment and each of which comprises a final portion which is arranged below a respective said processing station, each one of said segments defining, together with a related said processing station and with a related said elevator means, a processing module with independent actuation.

11. Apparatus according to claim 7, wherein each one of said processing stations comprises a supporting and unloading conveyor for supporting related ones of pallets during filling thereof by said transfer means and for unloading the pallets once they are loaded, said supporting and unloading conveyors extending transversely with respect to said exit conveyor means.

12. Apparatus according to claim 11, wherein each one of said supporting and unloading conveyors comprises two second mutually adjacent motorized conveyors which are suitable for engaging opposite lateral portions of said pallets, said platform of the elevator means related to each one of said processing stations being movable between the related said two second conveyors between said inactive position and an active raised position, wherein said platform is arranged at a higher level than the related said processing station.

13. Apparatus according to claim 12, wherein said two second conveyors of a same processing station are movable with respect to one another between a first normal position in which said two second conveyors define, between them, a passage whose width is at least equal to the width of said platform of the related elevator means, and a second position in which said second conveyors define, between them, a passage whose width is at least equal to the width of one of said pallets, actuation means being provided for moving said second conveyors between said first and second positions.

14. Apparatus for the selective palletization of articles which have different characteristics and which are identified by respective codes defining a set number of families of articles, the apparatus comprising a common feed conveyor for said articles, a reader for the related codes, and a palletization unit for the articles, wherein the palletization unit comprises: a plurality of processing stations, whose number is at least equal to the number of said families, for loading respective pallets and for removing the loaded pallets; and accumulation unit for accumulating unloaded pallets; exit conveyor means for transferring the unloaded pallets from said accumulation unit to said processing stations which are distributed along and above said exit conveyor means; elevator means for the unloaded pallets which are interposed between said exit conveyor means and each processing station; the apparatus further comprising automatic transfer means, controlled by said reader, for selectively transferring the articles from said common feeder conveyor to respective ones of said processing stations; and said exit conveyor means being divided into segments, each of which is connected to each adjacent segment and each of which comprises a final portion which is arranged below a respective said processing station, each one of said segments being provided with independent actuation means, said exit conveyor means comprising a further segment which extends through said accumulation unit, and independent actuation means for said further segment; and said accumulation unit comprising an input conveyor for feeding in succession stacks of unloaded pallets above said further segment of said exit conveyor means, further elevator means for supporting one of said stacks of unloaded pallets in a raised position being raised above said further segment by a distance which is at least equal to the thickness of one of said pallets, and fork-like means which can move between an inactive position of disengagement from said stack of unloaded pallets and an active position of engagement with said stack, said fork-like means engaging, in use, when they are arranged in their active position, a second pallet from the bottom of one of said stacks arranged in said raised position.

15. Apparatus according to claim 14, wherein the actuation means of said further segment are reversible actuation means.

16. Apparatus according to claim 14, wherein said further portion of said exit conveyor means comprises two mutually adjacent motorized third conveyors which are adapted for engaging opposite lateral portions of said pallets, said further elevator means being movable between said third conveyor means among a first position, wherein they are supporting one of said stacks in said raised position, a second position, wherein they are arranged so as to be substantially coplanar with respect to said third conveyors, and a third position, wherein they are arranged above said second position by a distance which is equal to the thickness of one of said pallets.

17. Apparatus according to claim 14, wherein said processing stations define, above said exit conveyor means, a channel for the selective feeding of the unloaded pallets from said accumulation unit to each one of said processing stations.

18. Apparatus according to claim 14, wherein said exit conveyor means are divided into segments, each of which is connected to each adjacent segment and each of which comprises a final portion which is arranged below a respective said processing station, each one of said segments defining, together with a related said processing station and with a related said elevator means, a processing module with independent actuation.

19. Apparatus according to claim 14, wherein each one of said processing stations comprises a supporting and unloading conveyor for supporting related ones of said pallets during filling thereof by said transfer means and for unloading the pallets once they are loaded, said supporting and unloading conveyors extending transversely with respect to said exit conveyor means.

20. Apparatus according to claim 19, wherein each one of said supporting and unloading conveyors comprises two second mutually adjacent motorized conveyors which are suitable for engaging opposite lateral portions of said pallets, said platform of the elevator means related to each one of said processing stations being movable between the related said two second conveyors between said inactive position and an active raised position, wherein said platform is arranged at a higher level than the related said processing station.

21. Apparatus according to claim 20, wherein said two second conveyors of a same processing station are movable with respect to one another between a first normal position in which said two second conveyors define, between them, a passage whose width is at least equal to the width of said platform of the related elevator means, and a second position in which said second conveyors define, between them, a passage whose width is at least equal to the width of one of said pallets, actuation means being provided for moving said second conveyors between said first and second positions.

* * * * *

UNITED STATES PATENT AND TRADEMARK OFFICE
CERTIFICATE OF CORRECTION

PATENT NO. : 5,297,924
DATED : March 29, 1994
INVENTOR(S) : NERI ARMANDO, CESARI VERTER It is certified that error appears in the above-indentified patent and that said Letters Patent is hereby corrected as shown below:

On the cover sheet of the patent under Box 30, please change "00169 A/91" into -- B091/A000169 --.

Signed and Sealed this

Twenty-sixth Day of July, 1994

Attest:

BRUCE LEHMAN

Attesting Officer  Commissioner of Patents and Trademarks